United States Patent [19]
Keller et al.

[11] Patent Number: 5,609,271
[45] Date of Patent: Mar. 11, 1997

[54] MIXER AND MULTIPLE COMPONENT DISPENSING DEVICE ASSEMBLY AND METHOD FOR THE ALIGNED CONNECTION OF THE MIXER TO THE MULTIPLE COMPONENT DISPENSING DEVICE

[75] Inventors: Wilhelm A. Keller, Obstgartenweg 9, CH-6402 Merlischachen, Switzerland; Richard J. Wilson, Andover, Mass.

[73] Assignee: Wilhelm A. Keller, Merlischachen, Switzerland

[21] Appl. No.: 522,108

[22] Filed: Aug. 31, 1995

Related U.S. Application Data

[63] Continuation of Ser. No. 378,000, Jan. 25, 1995, abandoned.

[30]   Foreign Application Priority Data

Aug. 24, 1995 [EP]   European Pat. Off. ............ 95810530

[51] Int. Cl.⁶ .................................................. B67D 5/60
[52] U.S. Cl. ................................................ 222/145.6
[58] Field of Search ........................ 222/137, 145.1, 222/145.6, 570, 568; 366/339

[56]                References Cited

U.S. PATENT DOCUMENTS

| | | |
|---|---|---|
| 2,816,518 | 12/1957 | Daggett . |
| 3,143,255 | 8/1964 | Leeds . |
| 3,323,682 | 6/1967 | Creighton et al. . |
| 3,884,388 | 5/1975 | Holcomb . |
| 4,014,463 | 3/1977 | Hermann . |
| 4,117,551 | 9/1978 | Books et al. . |
| 4,240,566 | 12/1980 | Bergman . |
| 4,432,469 | 2/1984 | Eble et al. . |
| 4,471,888 | 9/1984 | Herb et al. . |
| 4,538,920 | 9/1985 | Drake . |
| 4,566,610 | 1/1986 | Herb . |
| 4,687,663 | 8/1987 | Schaeffer . |
| 4,690,306 | 9/1987 | Stäheli . |
| 4,747,517 | 5/1988 | Hart . |
| 4,753,536 | 6/1988 | Spehar et al. . |
| 4,767,026 | 8/1988 | Keller et al. ............................ 222/137 |
| 4,771,919 | 9/1988 | Ernst . |
| 4,846,373 | 7/1989 | Penn et al. . |
| 4,869,400 | 9/1989 | Jacobs . |
| 4,871,090 | 10/1989 | Hoffman . |
| 4,913,553 | 4/1990 | Falco . |
| 4,946,079 | 8/1990 | Campbell . |
| 4,974,756 | 12/1990 | Pearson et al. . |
| 4,978,336 | 12/1990 | Capozzi et al. . |
| 4,981,241 | 1/1991 | Keller ..................................... 222/137 |
| 4,989,758 | 2/1991 | Keller ..................................... 222/137 |
| 4,995,540 | 2/1991 | Colin et al. ............................. 222/137 |
| 5,020,694 | 6/1991 | Pettengill . |
| 5,022,563 | 6/1991 | Marchitto et al. . |
| 5,033,650 | 7/1991 | Colin et al. . |
| 5,038,963 | 8/1991 | Pettengill et al. . |

(List continued on next page.)

FOREIGN PATENT DOCUMENTS 2232910A   1/1991   United Kingdom .

*Primary Examiner*—Philippe Derakshani
*Attorney, Agent, or Firm*—Richard Linn

[57]                ABSTRACT

The mixer of the mixer-cartridge assembly comprises a housing, an inlet section having an individual inlet for each outlet of the cartridge and a mixer element group. The mixer inlet section comprising a separating element and the mixer element group are arranged thus, that while sealingly connecting the mixer to the cartridge, the inlets of the mixer remain aligned with the corresponding and matching outlets of the cartridge as well as with the separating element and with the dividing element of the mixer element group for optimizing the mixing of the components. For mixer attachment, the mixer housing comprises bayonet lugs cooperating with bayonet prongs on the cartridge, whereby the housing is rotated while the mixer inlet section, separating element and element group do not rotate in regard to the cartridge outlets, thus avoiding cross-contamination of the components at the cartridge/mixer interface and assuring continued separation well into the mixer up to the first dividing element.

14 Claims, 7 Drawing Sheets

U.S. PATENT DOCUMENTS

| | | |
|---|---|---|
| 5,065,906 | 11/1991 | Maeder . |
| 5,080,262 | 1/1992 | Herold et al. . |
| 5,137,182 | 8/1992 | Keller . |
| 5,228,599 | 7/1993 | Keller . |
| 5,249,709 | 10/1993 | Duckworth et al. ............... 222/327 |
| 5,249,862 | 10/1993 | Herold et al. ............... 222/137 |
| 5,289,949 | 3/1994 | Gentile . |
| 5,333,760 | 8/1994 | Simmen . |
| 5,413,253 | 5/1995 | Simmen . |

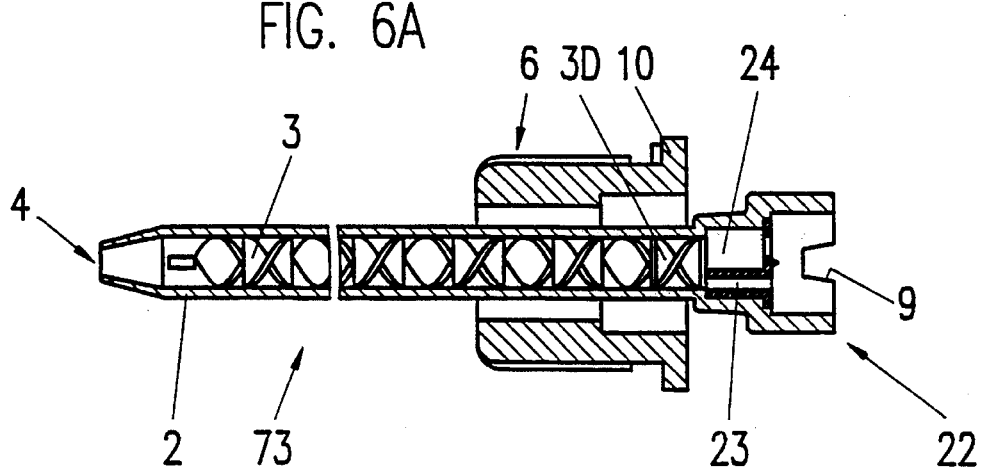
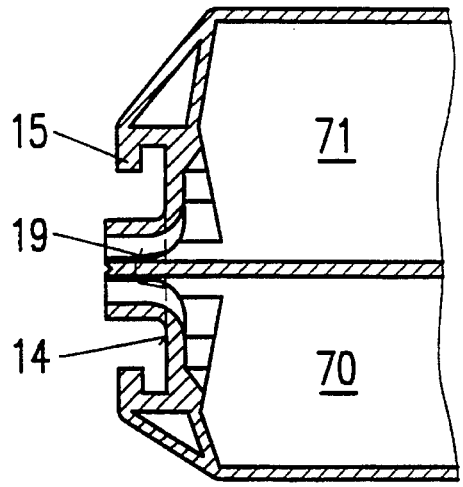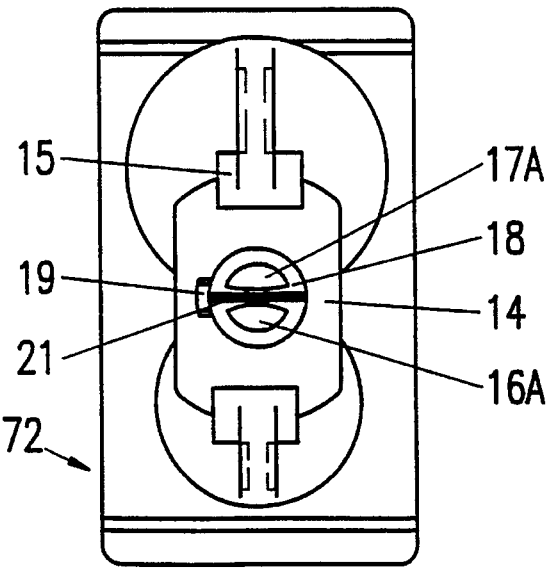

MIXER AND MULTIPLE COMPONENT DISPENSING DEVICE ASSEMBLY AND METHOD FOR THE ALIGNED CONNECTION OF THE MIXER TO THE MULTIPLE COMPONENT DISPENSING DEVICE

The present patent application is a continuation in part of patent application Ser. No. 08/378,000 filed Jan. 25, 1995, now abandoned.

BACKGROUND OF THE INVENTION

The present invention relates to a mixer and a multiple reactive component dispensing device assembly, in particular a two-component cartridge, the mixer comprising a mixer housing, a mixer element group, a mixer inlet section having separate inlets for each outlet of the cartridge, the cartridge comprising at least two containers and an outlet area with separate outlets for each container, the mixer and the cartridge being provided with cooperating attaching means.

There exists a great number of mixers and cartridges having means for connecting and attaching the mixer to the cartridge, e.g. according to U.S. Pat. No. 4,767,026 or U.S. Pat. No. 4,538,920 where the mixer has two bayonet locking lugs insertable into corresponding prongs on the cartridge. The rotary locking movement will cause contamination of one component against the other component at the interface between the cartridge and the mixer in that these components will be transported from one outlet to the other outlet, or from one inlet to the other inlet, causing an undesired reaction between them at the interface between cartridge and mixer and eventually carrying such a reaction back into the cartridge outlets, thus causing plugging of the outlets.

U.S. Pat. No. 5,228,599 discloses a multiple component dispensing cartridge having a mixer attached thereto with the aid of a coupling nut having an internal thread, wherein each storage cylinder ends in a dispensing opening which forms a common outlet, whereas the inlet of the mixer is not defined. The mixer is put on the cartridge and secured with the coupling nut screwed on an external thread at the cartridge.

DE-U-94 05 922 discloses a two component cartridge wherein the containers are arranged concentrically and whereas the outlets are side by side and D-shaped. For better discharge of the residual material two sleeves are connected to the mixer. These sleeves, however, do not prevent cross-contamination of the two components while connecting or disconnecting the mixer to and from the cartridge.

There is also a tendency towards components with faster reactivity for quicker end use, which causes greater problems with materials of construction of the package, chemical migration through the separating wall from part of the package to another and hence unwanted reaction within the package.

Cartridges separated by one single wall, e.g. according to U.S. Pat. No. 5,333,760, cannot exclude chemical migration through such a single wall separation barrier and therefore separation at the cartridge outlets is not sufficient if a reaction takes place during storage within the cylinders.

SUMMARY OR THE INVENTION

On the basis of this prior art, it is an object of the present invention to provide for a mixer and a multiple reactive component dispensing device assembly and a method for the aligned connection of that mixer to the multiple reactive component dispensing device which, during attachment, avoids cross-contamination by keeping the reactive components separated from the cartridge outlets well into the mixer, at the same time providing for optimum mixing efficiency.

This object is attained by a mixer and a multiple reactive component dispensing device assembly wherein said mixer inlet section of the mixer comprises separating means for maintaining separation of the components beyond the separate inlets, the mixer element group and the inlet section being arranged such, that while sealingly connecting the mixer to the cartridge, the inlets of the mixer inlet section remain aligned with the corresponding and matching outlets of the cartridge and the separating means are —after attaching the mixer assembly —aligned with the first dividing element of the mixer element group.

It is a further object of the invention to provide for a cartridge which assures a total chemical separation along the whole length from where the chemicals are contained, ahead of the cylinder pistons, all the way through to the top of the outlets where, during storage, a closure means is installed. This further object is attained with a cartridge wherein the containers and outlets are substantially separated by an air gap in between.

The invention will be explained in more detail hereinafter with reference to a drawing of embodiments.

BRIEF DESCRIPTION OF THE DRAWINGS

FIGS. 1–5 show a first embodiment of the invention comprising a coupling ring, wherein FIG. 1 is a section of a mixer, FIG. 2 is a view on the inlet end of the mixer, FIG. 3 is a side view of the outlet part of a cartridge with side by side outlets, FIG. 4 is a top view of the cartridge of FIG. 2, FIG. 5 is a top view of the coupling ring, FIGS. 6A–6C show a variant of the mixer of the first embodiment with different separating means and a cartridge with two containers having different volumes, FIGS. 7–10 show a second embodiment of the invention employing a coupling ring, wherein FIG. 7 is a section of a mixer, FIG. 8 is a side view of the outlet part of a cartridge with distanced outlets, FIG. 9 is a top view of the cartridge of FIG. 8, FIG. 10 is a view on the inlet end of the mixer with the coupling ring, FIGS. 12–14 show a third embodiment of the invention with a rotatable mixer housing, wherein FIG. 12 is a partial section of a mixer and a side view of the outlet part of a cartridge with side by side outlets, FIG. 13 is a top view of the cartridge of FIG. 12, FIG. 14 is a view on the inlet end of the mixer.

DETAILED DESCRIPTION OF THE INVENTION

Figure 1:
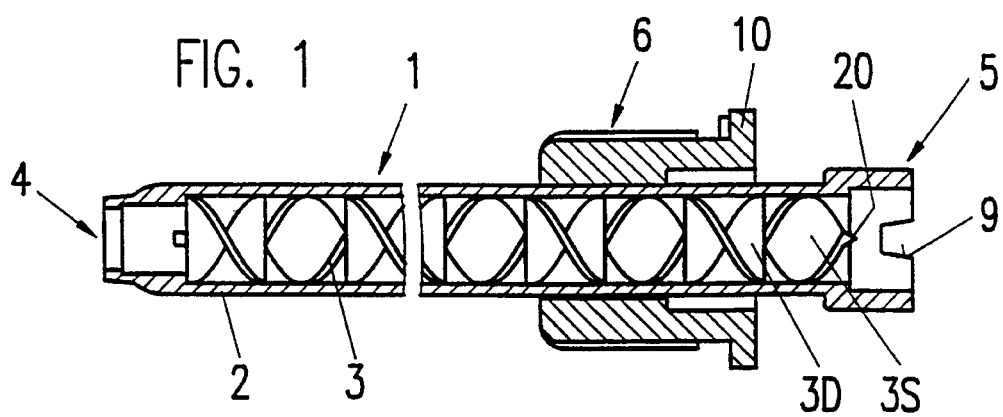
Figure 2:
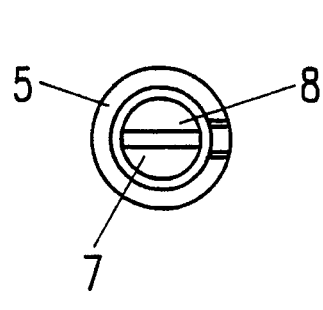

FIG. 1 shows in a first embodiment a mixer 1 comprising a mixer housing 2, a mixer element group 3, a mixer outlet 4 and a mixer inlet section 5. This mixer is fixed to the cartridge with the aid of a coupling ring 6. It follows in particular from FIG. 2 that the mixer inlet section 5 forms two D-shaped, individual inlet openings 7 and 8 at the face of the mixer separating element 3S serving in this embodiment as a separating means for guiding each component separately to the first dividing element 3D of the mixer element group 3. A slot 9 aligns the mixer in regard to the cartridge.

As in this case and all further similar mixer embodiments without separated chambers, the separating element 3S of the mixer element group is arranged such that its leading edge 20, see FIG. 1, is in line with the plane separating the two inlets and the next element, which is the first dividing element 3D, is at 90° to it such that its leading edge divides the two component streams evenly for optimum mixing.

Figure 5:
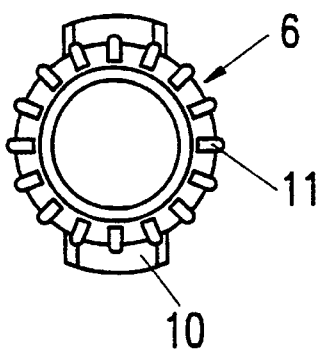

At the mixer inlet end facing the cartridge, the coupling ring 6 see FIG. 5 is provided with two bayonet lugs 10 and, for better manual gripping, ribs 11, on the outer cylindrical surface.

Figure 3:
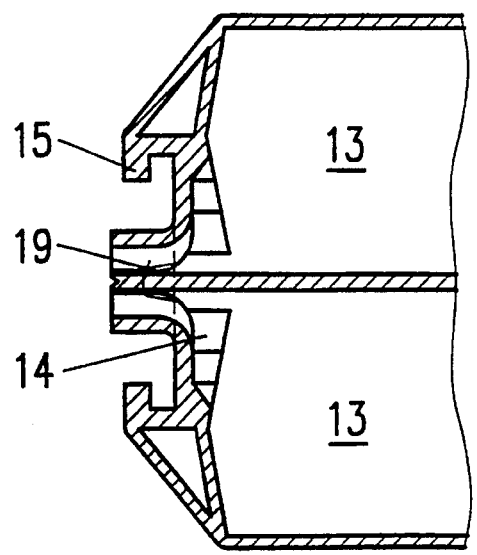
Figure 4:
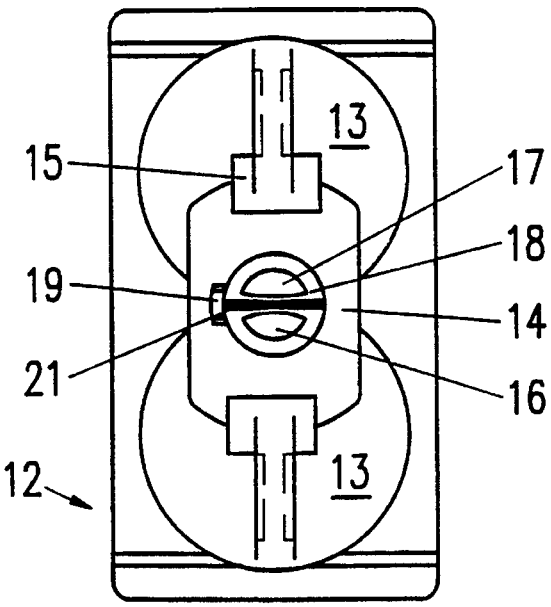

With cartridge 12, see FIGS. 3 and 4, only the outlet area is shown, the cartridge comprising two cylindrical containers 13, a connecting flange 14 with two bayonet prongs 15 receiving the bayonet lugs 10 of the mixer. The two individual, side by side outlets 16 and 17 are contained within an outlet tube 18 comprising a nose piece 19 cooperating with slot 9 at the inlet of the mixer 1 for aligning the mixer 1 to the cartridge 12. The openings of the side by side outlets 16 and 17 of the cartridge correspond to the two D-shaped individual mixer inlet openings 7 and 8 formed by the leading edge 20 of the separating element 3S. The cylindrical mixer inlet section 5 is formed for a sealing connection with the cartridge outlet tube 18 while fitting over the nose piece 19 of the cartridge.

It is important to note that when the mixer 1 is attached to the cartridge 12, both chemical component streams leaving the side by side outlets 16 and 17 of the cartridge are separated by the first separating mixer element 3S so that no chemical component material flow is possible from one cartridge outlet 16 across to the other cartridge outlet 17. Leading edge 20 of the separating element 3S of mixer element group 3, facing the cartridge outlet tube 18, fits and is pressed onto the surface or into the groove 21 between the two side by side outlets 16 and 17 and ensures component separation. Thus, separation of the components is maintained until the components reach the first dividing element 3D of the mixer element group.

When connecting the mixer 1 to the cartridge 12 the nose piece 19 on the cartridge can only fit into slot 9 of the mixer inlet section 5. This coded connection method assures not only one alignment possibility but also axial mixer attachment without rotation, thus preventing contamination of one chemical component by the other at the side by side outlets. The bayonet lugs 10 of the coupling ring 6 enable a quick attachment of the mixer.

FIGS. 6A–C show a variant to the embodiment shown in FIGS. 1–5 in that container 70 with outlet 16A of cartridge 72 has a smaller cross-sectional area than container 71 with outlet 17A. Also the mixer inlet section 22 has a separating means within the mixer 73 and comprises separated inlet chambers 23 and 24 having different cross-sectional areas and a smaller combined diameter than the cartridge outlet. This alternative separating means can have separated inlet chambers with equal cross-sectional areas or other than 1:1. For example, the ratio of the cross-sectional areas of the separated inlet chambers can be adapted relative to cross-sectional areas of the containers of the cartridge, or to its metering ratio. In this embodiment the separating means is fixedly connected to the mixer element group.

Figure 7:
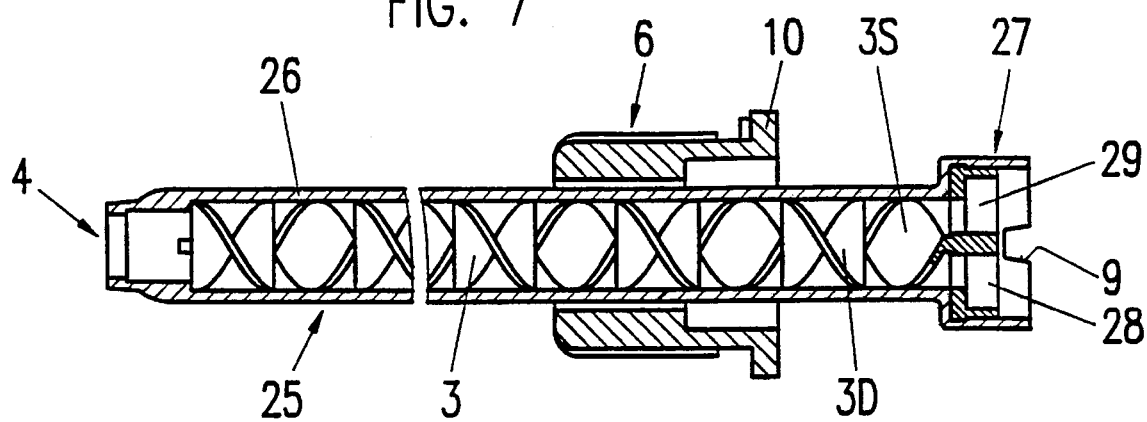

FIG. 7 shows in a second embodiment mixer 25 comprising a mixer housing 26, the mixer element group 3, the mixer outlet 4 but with a mixer inlet section 27 with two cylindrical, separate inlets 28 and 29 followed by the separating element 3S of mixer element group 3. This mixer is also connected to the cartridge with the aid of the coupling ring 6. The coupling ring 6 is the same as or similar to the coupling ring of the previous embodiment, comprising bayonet lugs 10. In this embodiment all mixer internal parts are integral with properly aligned mixer element group 3.

Figures 8, 9:
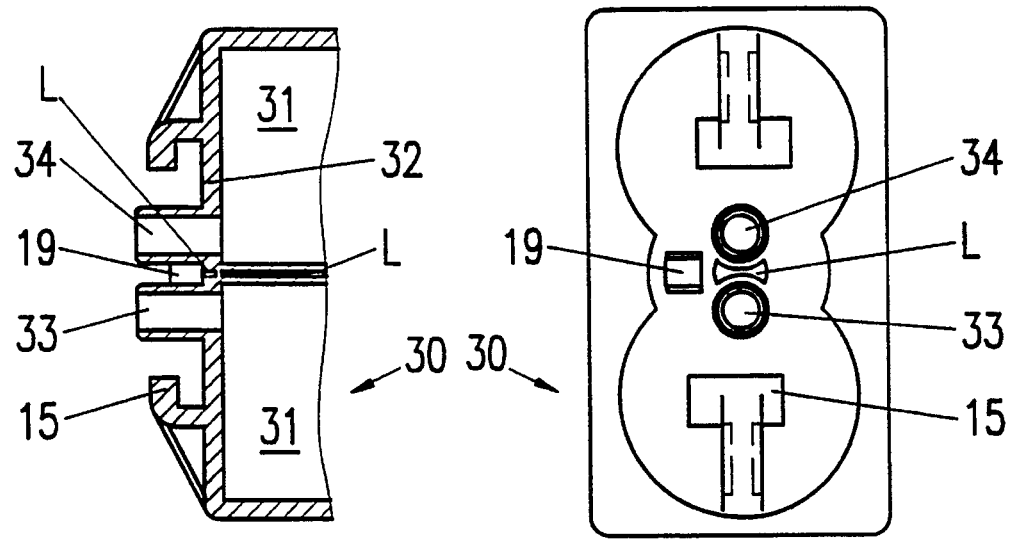

The cartridge 30 comprises two cylindrical containers 31 of equal cross-sectional area substantially separated by an air gap L, see FIGS. 8 and 9, an outlet face 32 with the two bayonet prongs 15 for receiving the bayonet lugs 10 of the coupling ring 6. Cartridge outlet face 32 comprises two distanced outlets 33 and 34 which correspond to the respective inside diameters of the separate mixer inlets 28 and 29, whereby they fit and seal over the outlets of the cartridge. Also in this embodiment, both the outlets of the cartridge and the inlets of the mixer are separated at a distance so that no chemical component flow is possible from one outlet (inlet) across to the other outlet (inlet). This arrangement, where the mixer inlets fit over the cartridge outlets, results in a smaller diameter of the mixer inlet section 27 than reversed arrangements with the same crosssectional flow area of the cartridge outlets.

By providing a single piece cartridge with complete containers, in the form of cylinders which are separated by an air gap L in between, a total chemical separation, substantially along the whole length wherein the chemicals are contained ahead of the cylinder pistons and all the way to the top of the outlets, is both assured and maintained within the mixer inlet section up to the first dividing element 3D of the mixer element group 3.

The invention however, is not limited to air gap separated containers and applies as well to cartridges with containers separated by one single wall according to FIG. 3.

Figure 10:
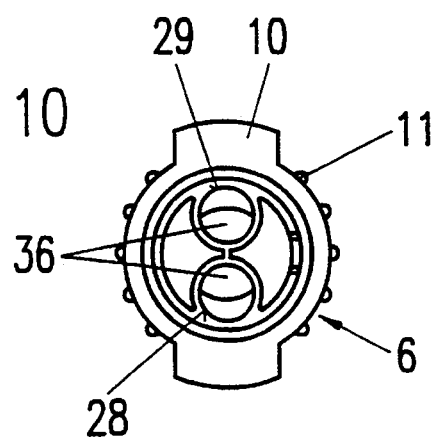

The separate inlets 28 and 29 (see FIG. 10 of the mixer) terminate in two separate inlets 36 leading to the separating element 3S. The method of the aligned connection of the mixer to the cartridge is axial and the same as the aforementioned without rotation of the separating means integral with mixer element group.

Figure 11A:
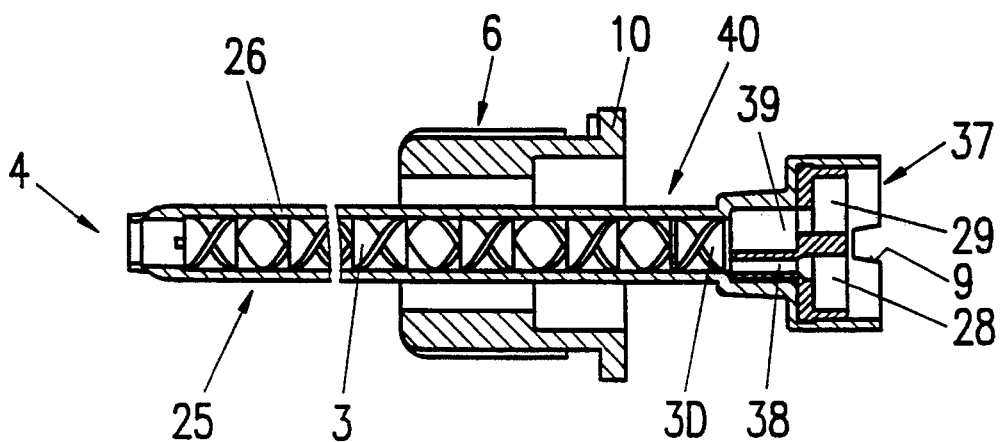
FIGS. 11A–11C show a variant of the mixer of the second embodiment with separating means and a cartridge with two containers having different volumes and distanced outlets.
Figure 11B:
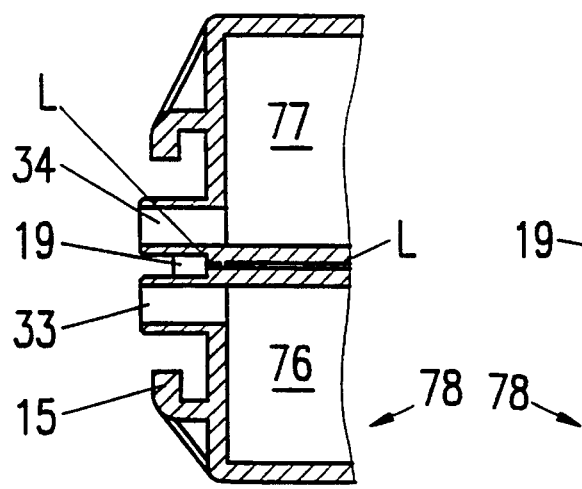
Figure 11C:
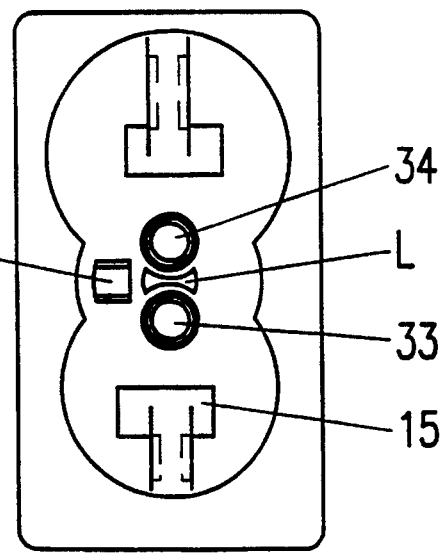

FIGS. 11A–C show a variant to the embodiment shown in FIGS. 7–10 in that the containers 76 and 77 of cartridge 78 have different cross-sectional areas and are also separated by an air gap L, see FIGS. 11B and 11C. The inlet section 37 of mixer 40 is similar to the mixer inlet section 27 of FIG. 6, whereby the separate inlets 28 and 29 each end in a separated inlet chamber 38 and 39, respectively of different cross-sectional areas so as to correspond to different cartridge metering ratios and are housed in a smaller diameter with reference to the mixer inlet section 37 and terminating in an outlet opening for each chamber for material to pass through. This arrangement is preferable for, but not limited to, mixing ratios other than 1:1. Distanced outlets 33 and 34 and separate inlets 28 and 29 can also be of different cross-sections to reflect the different cross-sectional areas of the cartridge containers.

Figure 12:
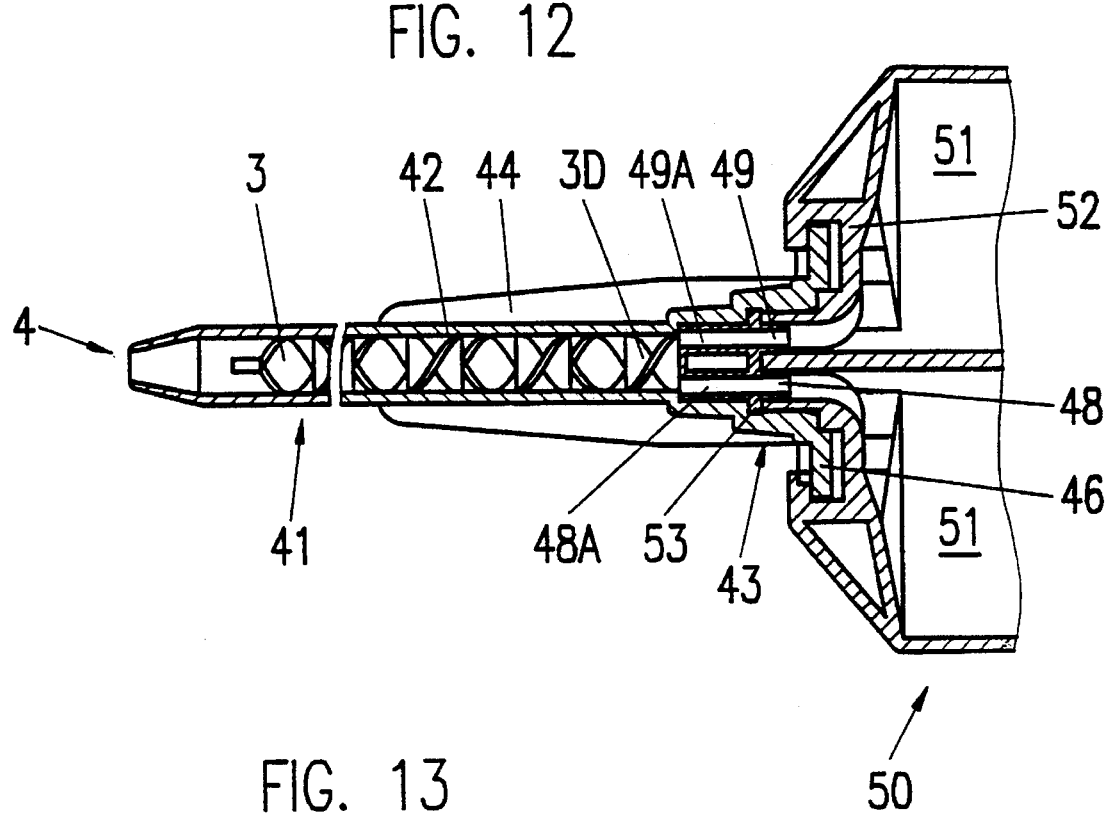

FIG. 12 shows, in a further embodiment, mixer 41 comprising a mixer housing 42, the mixer element group 3, the mixer outlet 4 and a mixer inlet section 43 with the separated inlets 48 and 49 leading to the separated chambers 48A and 49A which are fixedly attached to a properly aligned separating element 3S of the mixer element group 3. This mixer is attached to the cartridge by pressing the mixer onto the cartridge and by rotating the mixer housing 42 of the mixer, whereas the mixer element group 3 and the separated chambers 48A and 49A do not rotate. The mixer housing is provided with longitudinal ribs 44 which end at a flange 45, the two lateral ends of which are formed as bayonet lugs 46 cooperating with the bayonet prongs 15 of the cartridge. The inner wall of the mixer inlet section 43 is stepped and the separated chambers are provided with a sealing flange 53.

The mixer element group 3 is connected to the separated chambers 48A and 49A. The sealing flange 53 is disposed in such a way within the housing that the housing itself is rotatable around the mixer element group 3 with attached separating means and combined separated inlets 48 and 49. The sealing flange 53 will provide sealing between the inlet section and the mixer housing containing the mixer element group.

The cartridge 50 comprises two cylindrical containers 51, and in this embodiment, a connecting flange 52 with the two bayonet prongs 15 for receiving the bayonet lugs 46 of the mixer 41. The stepped outlet nozzle 54 of the cartridge has two individual, separate D-shaped side by side outlets 55 and 56 which correspond to the respective outside shape of the separated inlets 48 and 49 of the mixer whereby they fit and seal into the outlets 55 and 56. Also in this embodiment both the outlets of the cartridge and the prealigned inlets of the mixer are connected axially such that no direct chemical component flow or contact is possible from one outlet across to the other outlet during attachment.

Figure 13:
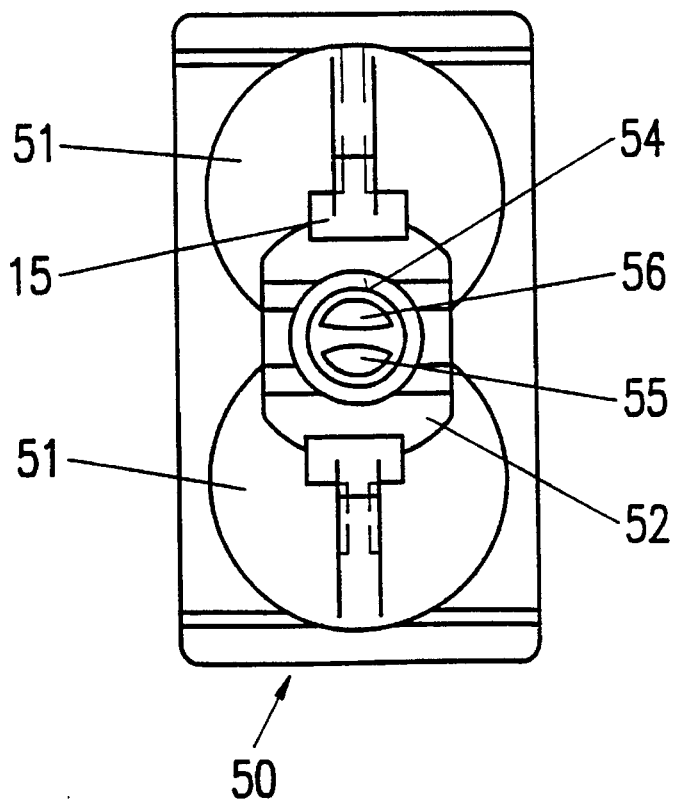
Figure 14:
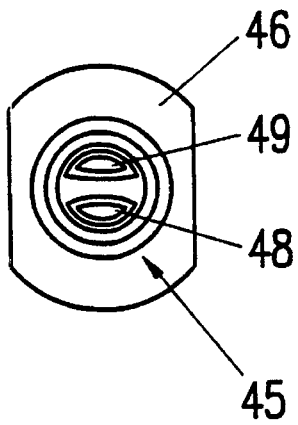
Figure 15:
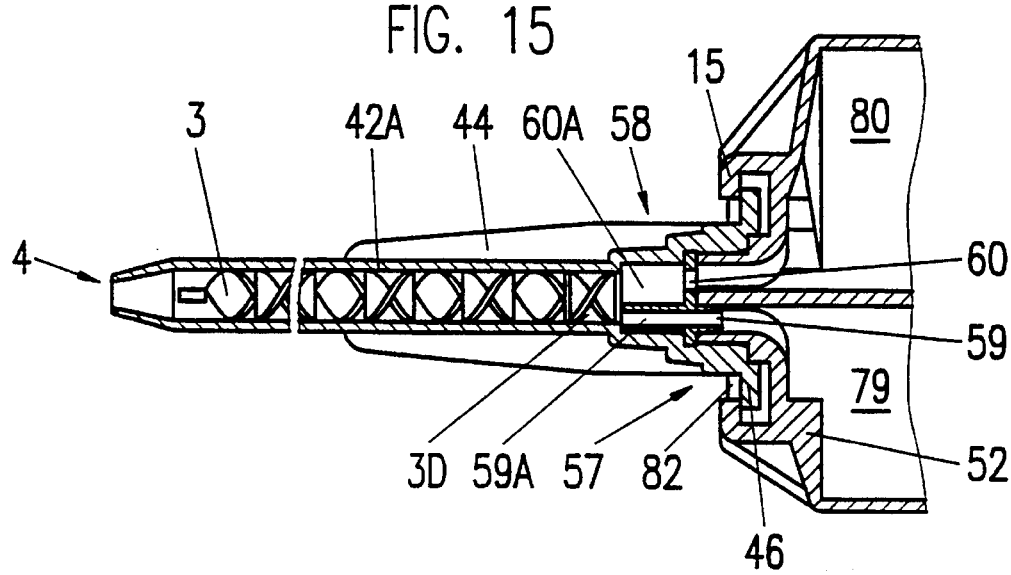
FIGS. 15–17 show a variant of the mixer of FIG. 12 with two containers having different volumes.
Figure 16:
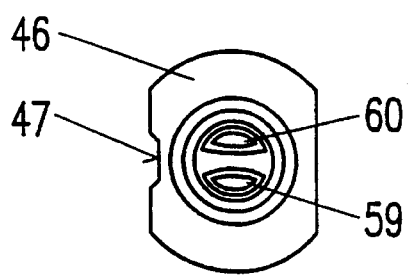
Figure 17:
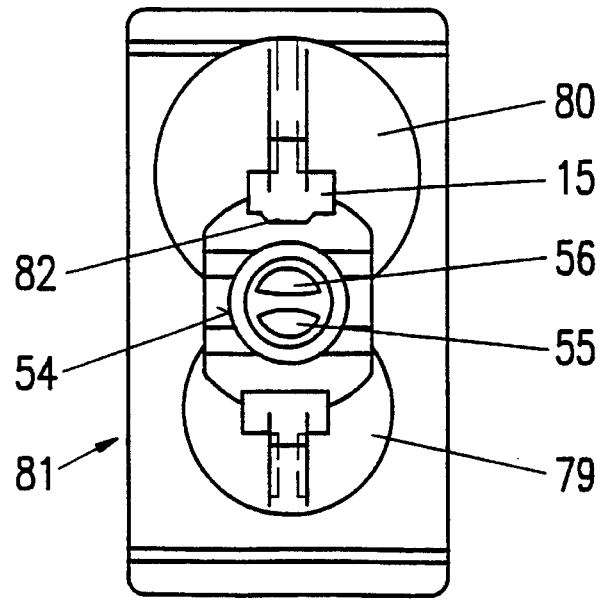

FIGS. 15–17 show a variant to the embodiment shown in FIGS. 12–14 in that the containers 79 and 80 of cartridge 81 have different cross-sectional areas. The mixer inlet section 57 of mixer 58 comprises a separated inlet 59 and an inlet opening 60 but each ending in separated chambers 59A and 60A with different cross-sections within a reduced diameter in comparison with the inlet section. This arrangement is preferable for mixing ratios other than 1:1, but not limited to them. For mixing ratios other than 1:1 it may be preferable to omit inlet part 49 of the major component which enters the mixer inlet section in order to adapt the cross-section of the flow path to the mixing ratio.

One longitudinal side between the bayonet lugs 46 has a recess 47 (see FIG. 16) and one of the bayonet prongs 15 has, at one of its lateral sides, a nose piece 82 for cooperating with that recess 47 for the coded alignment of the mixer to the cartridge.

There are other coding means possible at the dispensing apparatus or cartridge and at the accessory for the coded alignment of the accessory to the dispensing apparatus or cartridge, e.g. pins, protruding parts of all kind fitting into a recess or cavity or slot.

For attaching the mixer to the cartridge, the mixer is aligned and pressed onto the cartridge such that the nose 82 fits into recess 47 of the mixer flange and the inlets of the mixer fit into the outlets of the cartridge. When the mixer is in place and the outlets and inlets are connected, mixer housing 42 of the mixer is rotated by 90° for the engagement of the bayonet lugs 46 in the bayonet prongs of the cartridge. This method prevents the contamination of one chemical component by the other by avoiding relative rotation at the mixer/cartridge interface and enables a quick attachment of the mixer.

Figure 18:
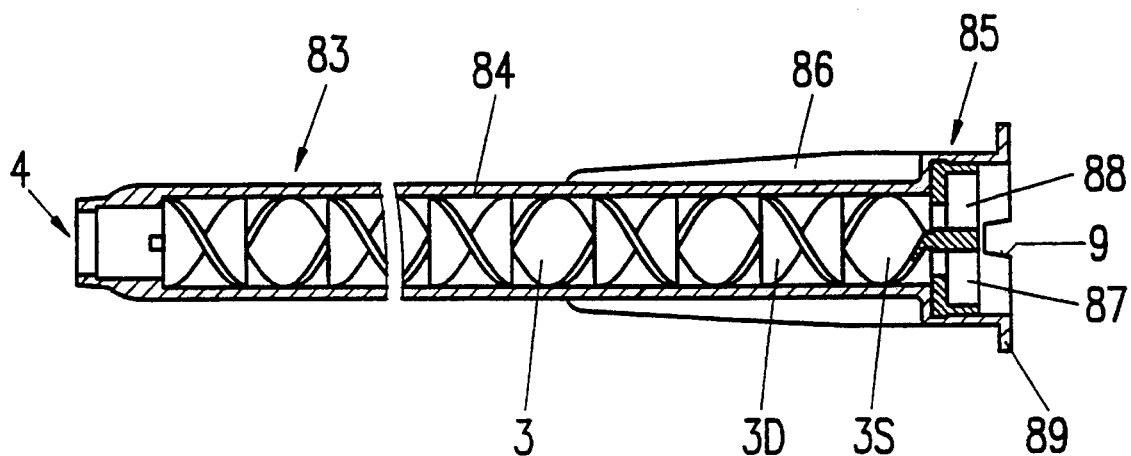
FIGS. 18 and 19 show a preferred embodiment of the invention in a partial section of a mixer and a top view of the outlet area of the cartridge.
Figure 19:
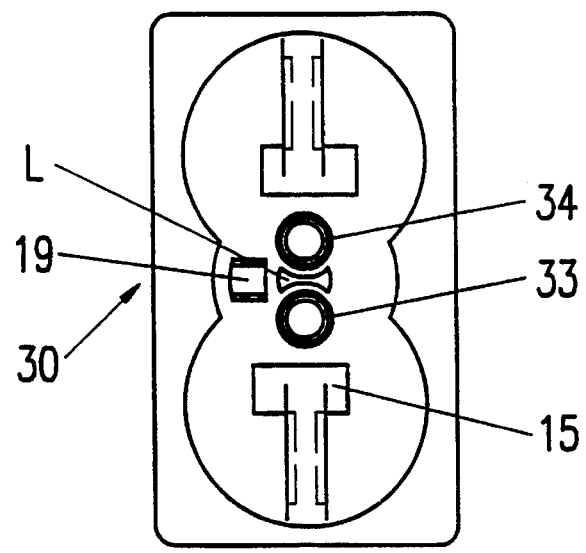

The FIGS. 18 and 19 show a preferred embodiment, combining the distanced outlets 33 and 34 of cartridge 30, having also complete cylindrical containers substantially separated by an air gap L. A mixer 83, with a mixer housing 84, has a mixer inlet section 85 with separate inlets 87 and 88 integral with the separating element 3S attached to the mixer element group 3 ending at the mixer outlet 4. The mixer housing 84 is provided with ribs 86 ending in bayonet lugs 89 cooperating with bayonet prongs 15 at the cartridge. Corresponding separate inlets 87 and 88 of the mixer 83 fit over the distanced outlets 33 and 34 of the cartridge 30.

This mixer is fixed to the cartridge by pressing the mixer onto the cartridge and by rotating the mixer housing 84 of the mixer, whereas the separate inlets 87 and 88, the separating element 3S and the mixer element group 3, comprising the first dividing element 3D, do not rotate. It is evident that this embodiment can also be provided with separated chambers ending at the first dividing element.

All the above described embodiments have the advantage of being compact and result in low moulding and assembly costs since the whole inlet section, comprising the separating means and the mixer element group, is made in one piece. The integral construction of the internal parts ensures proper alignment thus providing optimum mixing efficiency.

In the situation where a relatively long mixer element group is used and where rotational friction between this group and the housing might cause problems, it may be preferable to separate a part or the whole mixer element group from the separating means of the inlet section such that a part or the whole mixer element group may be fixedly assembled within the housing and therefore rotates while connecting the mixer to the cartridge. In this case —and as seen from the mixer inlet to the mixer outlet —the leading edge of the first element of the mixer element group, or of the portion thereof fixedly assembled within the housing, must be assembled in a pre-aligned position such that after rotating the housing so as to attach the mixer to the cartridge, correct alignment is achieved such that each material stream leaving the separating means, or the first element group attached to the separating means, will be evenly divided by the leading edge of the first element of the element group, or portion thereof fixedly assembled within the housing, for optimizing mixing efficiency.

It is evident that instead of embodiments with D-shaped inlets and outlets, cylindrical, differently shaped, or dissimilar sized inlets and outlets are possible. Furthermore, the same principle can be used also for a dispensing device or cartridge dispensing more than two components.

It follows from the above description that the inventive mixer-cartridge combination provides, in particular for cartridge containers substantially separated by an air gap up to and including the individual outlets, a port to port coded alignment for same or dissimilar size ports, with no cross-contamination caused by rotation while also maintaining separation past the interface into the mixer so as to hinder the spreading of any possible reaction and plugging of the components at the interface and back into the cartridge outlets. This combination also provides optimization of the mixing performance, especially but not uniquely, for ratios other than 1:1.

While the foregoing description and the drawing of the cartridge embodiments pertained to multiple component cartridges with side-by-side containers, the teaching of the present invention is not limited thereto and can be applied as well to cartridges with concentric containers or otherwise arranged and formed containers, having side by side or distanced outlets.

We claim:

1. A mixer and a multiple reactive component dispensing device assembly, in particular a two-component cartridge, the mixer comprising a mixer housing, a mixer element group, a mixer inlet section having separate inlets for each outlet of the cartridge, the cartridge comprising at least two containers and an outlet area with separate outlets for each container, the mixer and the cartridge being provided with cooperating attaching means, wherein said mixer inlet section of the mixer comprises separating means for maintaining separation of the components beyond the separate inlets, the mixer element group and the inlet section being arranged such, that while sealingly connecting the mixer to the cartridge, the inlets of the mixer inlet section remain aligned with the corresponding and matching outlets of the cartridge and the separating means are —after attaching the mixer —aligned with a first dividing element of the mixer element group.

2. A mixer according to claim 1, wherein said parts of the mixer inlet section including the separating means and the mixer element group are aligned and fixedly connected to each other.

3. A mixer according to claim 1, wherein said mixer element group or a portion of the mixer element group is fixedly assembled within said mixer housing with a leading edge of a first mixing element in a prealigned position, wherein said mixer element group or portion of the mixer element group and the inlet section of the mixer are arranged such that a rotation is possible between the inlet section and the mixer element group or portion of the mixer element group, whereby —as seen from the mixer inlet to the mixer outlet —after a rotation required to attach the mixer, the leading edge of the first mixing element of the mixer element group, or portion of the mixer element group, which is not fixedly attached to the inlet section, is aligned with the inlet section, or with a mixer element group portion attached to the inlet section, so as to evenly divide each material stream for optimum mixing efficiency.

4. A mixer according to claim 1, wherein—as seen from the mixer inlet to the mixer outlet—the first element of the mixer element group is arranged such that it serves as a separating means for maintaining separation of the components.

5. A mixer according to claim 1, wherein said separating means of the mixer inlet section consists of separated chambers leading to the first dividing element of the mixer element group.

6. A mixer according to claim 1, wherein said mixer housing, the mixer element group and the mixer inlet section are fixedly assembled together and are attached via a coupling ring to the dispensing device or cartridge.

7. A mixer according to claim 1, wherein said mixer element group and the mixer inlet section are fixedly connected and arranged in the mixer housing such that the housing is rotatable around the fixedly connected internal parts of the mixer during the attachment of the mixer to the dispensing device or cartridge.

8. A mixer according to claim 3, wherein said housing, along with said fixedly assembled mixer element group or portion of said mixer element group, is rotatable relative to the mixer inlet section and separating means while attaching the mixer to the dispensing device or cartridge.

9. A multiple reactive component dispensing device according to claim 1, wherein said outlets of the cartridge are separate and individual, arranged side by side or distanced and are approximately D-shaped or cylindrical.

10. A multiple reactive component dispensing device according to claim 1 or 9, wherein said containers and the outlets are substantially separated by an air gap in between.

11. An assembly according to claim 1, wherein said mixer housing and the outlet area of the cartridge are provided with mutual coding means for ensuring alignment of the mixer to the cartridge.

12. A multiple reactive component dispensing device, in particular a two-component cartridge according to claim 1, wherein said cartridge is a single piece cartridge composed of at least two complete containers with at least two separate outlets, substantially separated by an air gap in between.

13. A method for connecting the mixer of claim 1 to a multiple reactive component dispensing device in particular a cartridge, comprising the steps of:

fixedly assembling together the mixer housing, the mixer element group and the mixer inlet section:

engaging first the inlets of the mixer to the corresponding outlets of the dispensing device; and then engaging a coupling ring to the cartridge in such a way that the inlets of the mixer remain aligned to the outlets of the cartridge, thus preventing cross-contamination of the components.

14. A method for connecting the mixer of claim 1 to a multiple reactive component dispensing device comprising the steps of:

fixedly connecting and arranging the mixer element group and the mixer inlet section in the mixer housing such that the housing is rotatable around the fixedly connected internal parts of the mixer during the attachment of the mixer to the cartridge;

engaging first the inlets of the mixer to the corresponding outlets of the cartridge; and then rotating the housing of the mixer for engaging its attaching means to the attaching means of the cartridge in such a way that the inlets of the mixer stay aligned to the outlets of the cartridge, thus preventing cross-contamination of the components.

* * * * *